US009262638B2

(12) United States Patent
Nachenberg et al.

(10) Patent No.: US 9,262,638 B2
(45) Date of Patent: *Feb. 16, 2016

(54) HYGIENE BASED COMPUTER SECURITY

(71) Applicant: Symantec Corporation, Mountain View, CA (US)

(72) Inventors: Carey S. Nachenberg, Northridge, CA (US); Kent E. Griffin, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/666,788

(22) Filed: Nov. 1, 2012

(65) Prior Publication Data
US 2013/0086690 A1  Apr. 4, 2013

Related U.S. Application Data

(63) Continuation of application No. 11/618,215, filed on Dec. 29, 2006, now Pat. No. 8,312,536.

(51) Int. Cl.
*G06F 21/50* (2013.01)
*G06F 21/57* (2013.01)

(52) U.S. Cl.
CPC .............. *G06F 21/577* (2013.01); *G06F 21/50* (2013.01)

(58) Field of Classification Search
CPC ................................................... G06F 21/577
USPC ...................... 726/22–25; 713/188
See application file for complete search history.

(56) References Cited

U.S. PATENT DOCUMENTS

| 6,233,606 B1 | 5/2001 | Dujari |
| 6,347,332 B1 | 2/2002 | Malet et al. |
| 6,556,989 B1 | 4/2003 | Naimark et al. |
| 7,197,539 B1 | 3/2007 | Cooley |
| 7,272,719 B2 * | 9/2007 | Bleckmann et al. .......... 713/176 |

(Continued)

FOREIGN PATENT DOCUMENTS

WO    WO 2009/076555 A2    6/2009

OTHER PUBLICATIONS

Werner; Redefining computer literacy in the age of ubiquitous computing; Published in: Proceeding SIGITE '05 Proceedings of the 6th conference on Information technology education; 2005; pp. 95-99; ACM Digital Library.*

Tran et al.; A Trust based Access Control Framework for P2P File-Sharing Systems; Published in: System Sciences, 2005. HICSS '05. Proceedings of the 38th Annual Hawaii International Conference on; Date of Conference: Jan. 3-6, 2005; pp. 1-10; IEEE Xplore.*

(Continued)

*Primary Examiner* — Bradley Holder
(74) *Attorney, Agent, or Firm* — Fenwick & West LLP

(57) ABSTRACT

A reputation server is coupled to multiple clients via a network. Each client has a security module that detect malware at the client. The security module computes a hygiene score based on detected malware and provides it to the reputation server. The security module monitors client encounters with entities such as files, programs, and websites. When a client encounters an entity, the security module obtains a reputation score for the entity from the reputation server. The security module evaluates the reputation score and optionally cancels an activity involving the entity. The reputation server computes reputation scores for the entities based on the clients' hygiene scores and operations performed in response to the evaluations. The reputation server prioritizes malware submissions from the client security modules based on the reputation scores.

16 Claims, 7 Drawing Sheets

(56) References Cited

U.S. PATENT DOCUMENTS

| | | | |
|---|---|---|---|
| 7,281,270 B2* | 10/2007 | Piesco et al. | 726/25 |
| 7,412,516 B1 | 8/2008 | Brown et al. | |
| 7,448,084 B1* | 11/2008 | Apap et al. | 726/24 |
| 7,472,420 B1 | 12/2008 | Pavlyushchik | |
| 7,546,349 B1 | 6/2009 | Cooley | |
| 7,562,304 B2* | 7/2009 | Dixon et al. | 715/738 |
| 7,565,358 B2 | 7/2009 | Minogue et al. | |
| 7,587,367 B2 | 9/2009 | Mengerink | |
| 7,668,951 B2 | 2/2010 | Lund et al. | |
| 7,765,481 B2 | 7/2010 | Dixon et al. | |
| 7,783,741 B2 | 8/2010 | Hardt | |
| 7,854,007 B2* | 12/2010 | Sprosts et al. | 726/24 |
| 7,870,608 B2 | 1/2011 | Shraim et al. | |
| 7,941,853 B2 | 5/2011 | Rozenberg et al. | |
| 8,001,606 B1 | 8/2011 | Spertus | |
| 8,019,689 B1 | 9/2011 | Nachenberg | |
| 8,065,731 B1 | 11/2011 | Nucci et al. | |
| 8,200,587 B2 | 6/2012 | Deyo | |
| 8,250,657 B1 | 8/2012 | Nachenberg et al. | |
| 8,312,536 B2 | 11/2012 | Nachenberg et al. | |
| 8,327,131 B1 | 12/2012 | Hardjono et al. | |
| 8,341,745 B1 | 12/2012 | Chau et al. | |
| 8,381,289 B1 | 2/2013 | Pereira et al. | |
| 8,392,997 B2 | 3/2013 | Chen et al. | |
| 8,413,251 B1 | 4/2013 | Gibney et al. | |
| 2002/0046041 A1 | 4/2002 | Lang | |
| 2002/0156668 A1 | 10/2002 | Morrow et al. | |
| 2003/0167308 A1 | 9/2003 | Schran | |
| 2004/0054661 A1 | 3/2004 | Cheung | |
| 2004/0138965 A1 | 7/2004 | Laughlin et al. | |
| 2005/0050335 A1 | 3/2005 | Liang et al. | |
| 2005/0268090 A1 | 12/2005 | Saw et al. | |
| 2005/0283837 A1 | 12/2005 | Olivier et al. | |
| 2006/0026123 A1 | 2/2006 | Moore et al. | |
| 2006/0085328 A1 | 4/2006 | Cohen et al. | |
| 2006/0212270 A1 | 9/2006 | Shiu et al. | |
| 2006/0212925 A1* | 9/2006 | Shull et al. | 726/1 |
| 2006/0212930 A1 | 9/2006 | Shull et al. | |
| 2006/0212931 A1 | 9/2006 | Shull et al. | |
| 2006/0218642 A1 | 9/2006 | Kuppusamy et al. | |
| 2006/0230039 A1 | 10/2006 | Shull et al. | |
| 2006/0253458 A1 | 11/2006 | Dixon et al. | |
| 2006/0253581 A1 | 11/2006 | Dixon et al. | |
| 2006/0253583 A1 | 11/2006 | Dixon et al. | |
| 2006/0253584 A1 | 11/2006 | Dixon et al. | |
| 2007/0011739 A1 | 1/2007 | Zamir et al. | |
| 2007/0016953 A1 | 1/2007 | Morris et al. | |
| 2007/0050444 A1 | 3/2007 | Costea et al. | |
| 2007/0067843 A1 | 3/2007 | Williamson et al. | |
| 2007/0094734 A1 | 4/2007 | Mangione-Smith et al. | |
| 2007/0107053 A1 | 5/2007 | Shraim et al. | |
| 2007/0124579 A1 | 5/2007 | Haller | |
| 2007/0130351 A1 | 6/2007 | Alperovitch et al. | |
| 2007/0136808 A1 | 6/2007 | Xiong | |
| 2007/0143629 A1 | 6/2007 | Hardjono et al. | |
| 2007/0156886 A1 | 7/2007 | Srivastava | |
| 2007/0162349 A1 | 7/2007 | Silver | |
| 2007/0192855 A1 | 8/2007 | Hulten et al. | |
| 2007/0233782 A1 | 10/2007 | Tali | |
| 2007/0240222 A1 | 10/2007 | Tuvell et al. | |
| 2008/0005223 A1 | 1/2008 | Flake et al. | |
| 2008/0028463 A1 | 1/2008 | Dagon et al. | |
| 2008/0077994 A1 | 3/2008 | Comlekoglu | |
| 2008/0082628 A1 | 4/2008 | Rowstron et al. | |
| 2008/0082662 A1 | 4/2008 | Dandliker et al. | |
| 2008/0104180 A1 | 5/2008 | Gabe | |
| 2008/0109244 A1 | 5/2008 | Gupta | |
| 2008/0109473 A1 | 5/2008 | Dixon et al. | |
| 2008/0109491 A1 | 5/2008 | Gupta | |
| 2008/0114709 A1 | 5/2008 | Dixon et al. | |
| 2008/0133540 A1 | 6/2008 | Hubbard et al. | |
| 2008/0133972 A1 | 6/2008 | Verbowski et al. | |
| 2008/0137864 A1 | 6/2008 | Jin et al. | |
| 2008/0140442 A1 | 6/2008 | Warner | |
| 2008/0140820 A1 | 6/2008 | Snyder et al. | |
| 2008/0141366 A1 | 6/2008 | Cross et al. | |
| 2008/0189788 A1 | 8/2008 | Bahl | |
| 2008/0222726 A1 | 9/2008 | Chayes et al. | |
| 2008/0255977 A1 | 10/2008 | Altberg et al. | |
| 2008/0263677 A1 | 10/2008 | Kaditz et al. | |
| 2009/0125382 A1 | 5/2009 | Delepet | |
| 2009/0217370 A1 | 8/2009 | Hulten et al. | |
| 2009/0254993 A1 | 10/2009 | Leone | |
| 2009/0282476 A1 | 11/2009 | Nachenberg et al. | |
| 2009/0319998 A1 | 12/2009 | Sobel et al. | |
| 2009/0328209 A1 | 12/2009 | Nachenberg | |
| 2010/0005291 A1 | 1/2010 | Hulten et al. | |
| 2010/0153354 A1 | 6/2010 | Buccella et al. | |
| 2010/0169970 A1 | 7/2010 | Stolfo et al. | |
| 2010/0211997 A1 | 8/2010 | McGeehan et al. | |
| 2011/0040825 A1 | 2/2011 | Ramzan et al. | |
| 2011/0055923 A1 | 3/2011 | Thomas | |
| 2011/0067101 A1 | 3/2011 | Seshadri et al. | |
| 2011/0225655 A1 | 9/2011 | Niemala et al. | |
| 2012/0197656 A1 | 8/2012 | Lang et al. | |
| 2012/0278264 A1 | 11/2012 | Deyo | |

OTHER PUBLICATIONS

Archive of "Abaca Products > Filtering Technology," www.abaca.com, [Online] [Archived by http://archive.org on Oct. 24, 2006; Retrieved on Apr. 11, 2013] Retrieved from the Internet<URL:http://web.archive.org/web/20061024023812/http://www.abaca.com/product_technology.html>.

Colvin, R., Program Manager, SmartScreen, "Stranger Danger"—Introducing SmartScreen® Application Reputation, Oct. 13, 2010, pp. 1-9, can be retrieved at <http://blogs.msdn.com/b/ie/archive/2010/10/13/stranger-danger-introducing-smartscreen-application-reputation.aspx>.

"McAfee SiteAdvisor: What is SiteAdvisor Software?" McAfee®, 2009, [Online] [Retrieved on Jul. 23, 2009] Retrieved from the Internet<URL:http://www.siteadvisor.com/howitworks/index.html>.

"StopBadware.org—StopBadware.org Frequently Asked Questions," stopbadware.org, 2009, [Online] [Retrieved on Jul. 23, 2009] Retrieved from the Internet<URL:htto://www.stopbadware.org/home/faq>.

Trend Micro™, "Outthink the Threat," A Trend Micro eBook, 2008, pp. 1-17, can be retrieved at <http://uk.trendmicro.com/imperia/md/content/campaigns/thinkagain/thinkagain_ebook.pdf>.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

Walsh, K., "Fighting PeertoPeer SPAM and Decoys with Object Reputation," ACM, Aug. 22-26, 2005, pp. 1-6.

International Search Report and Written Opinion, PCT Application No. PCT/US09/48328, Dec. 22, 2010, 8 pages.

Brin, S. et al., "The Anatomy of a Large-Scale Hypertextual Web Search Engine," Computer Networks and ISDN Systems, 1998, pp. 107-117, vol. 30, No. 1-7.

Christodorescu, M. et al., "Semantics-Aware Malware Detection," In Proceedings of the 205 IEEE Symposium on Security and Privacy, IEEE Computer Society, 2005.

Gonzalez, J. et al., "Residual Splash for Optimally Parallelizing Belief Propagation," AISTATS, 2009, 8 pages.

Gyongyi, Z. et al., "Combating Web Spam with Trustrank," Proceedings of the Thirtieth International Conference on Very Large Data Bases, VLDB Endowment, 2004, pp. 576-587, vol. 30.

Idika, N. et al., "A Survey of Malware Detection Techniques," Technical Report, Department of Computer Science, Purdue University, 2007, 48 pages.

Kephart, J. et al., "Automatic Extraction of Computer Virus Signatures," 4$^{th}$ Virus Bulletin International Conference, 1994, pp. 178-184.

Kleinberg, J., "Authoritative Sources in a Hyperlinked Environment," Journal of the ACM (JACM), 1999, pp. 604-632, vol. 46, No. 5.

(56) References Cited

OTHER PUBLICATIONS

Kolter, J. et al., "Learning to Detect and Classify Malicious Executables in the Wild," The Journal of Machine Learning Research, 2006, p. 2721-2744, vol. 7.
McGlohon, M. et al., "SNARE: A Link Analytic System for Graph Labeling and Risk Detection," Proceedings of the 15th ACM SIGKDD International Conference on Knowledge Discovery and Data mining, ACM, 2009, pp. 1265-1274, New York, N.Y.
Neville, J. et al., "Using Relational Knowledge Discovery to Prevent Securities Fraud," Proceedings of the Eleventh ACM SIGKDD International Conference on Knowledge Discovery in Data Mining, ACM, 2005, p. 458.
Neville, J. et al., "Collective Classification with Relational Dependency Networks," Workshop on Multi-Relational Data Mining (MRDM-2003), 2003.
Pandit, S. et al., "NetProbe: A Fast and Scalable System for Fraud Detection in Online Auction Networks," WWW '07, Proceedings of the 16th International Conference on World Wide Web, ACM, 2007, pp. 201-210, New York, N.Y.
Pei, J. et al., "On Mining Cross-Graph Quasi-Cliques," Proceedings of the Eleventh ACM SIGKDD International Conference on Knowledge Discovery in Data Mining, ACM, 2005, 11 pages.
Schultz, M. et al., "Data Mining Methods for Detection of New Malicious Executables," IEEE Symposium on Security and Privacy, IEEE Computer Society, 2001, pp. 38-49.
Siddiqui, M. et al., "A Survey of Data Mining Techniques for Malware Detection Using File Features," ACM-SE 46: Proceedings of the 46th Annual Southeast Regional Conference on XX, ACM, 2008, pp. 509-510, New York, N.Y.
Symantec Internet Security Threat Report, 36 pages, [Online] [Retrieved on Aug. 8, 2010] Retrieved from the Internet<URL:http://eval.symantec.com/mktginfo/enterprise/white_papers/b-whitepaper_exec_summary_internet_security_threat_report_xiii_04_2008.en-us.pdf>.
Symantec Malware Definition, [Online] [Retrieved on Aug. 6, 2010] Retrieved from the Internet<URL:http://www.symantec.com/norton/security_response/malwarejsp>.
Symantec Norton Community Watch Privacy Policy, [Online] [Retrieved on Aug. 6, 2010] Retrieved from the Internet<URL:http://www.symantec.com/about/profile/policies/ncwprivacy.jsp>.
Symantec Unveils New Model of Consumer Protection Codenamed "Quorum", 3 pages, [Online] [Retrieved on Aug. 8, 2010] Retrieved from the Internet<URL:https://www.symantec.com/about/news/release/article.jsp?prid=20090706_02>.
Tesauro, G. et al., "Neural Networks for Computer Virus Recognition," IEEE Expert, 1996, pp. 5-6, vol. 11, No. 4.
Tong, H. et al., "Fast Best-Effort Pattern Matching in Large Attributed Graphs," Proceedings of the 13th ACM SIGKDD International Conference on Knowledge Discovery and Data Mining, ACM, 2007, 10 pages.
U.S. Appl. No. 12/059,258, filed Mar. 31, 2008, Inventors Sourabh Satish et al.
U.S. Appl. No. 12/059,271, filed Mar. 31, 2008, Inventors Brian Hernacki et al.
U.S. Appl. No. 12/242,634, filed Sep. 30, 2008, Inventors Josephine Gibney et al.
U.S. Appl. No. 12/165,599, filed Jun. 30, 2008, Inventor Carey S. Nachenberg.
U.S. Appl. No. 12/407,772, filed Mar. 19, 2009, Inventors Carey S. Nachenberg et al.
U.S. Appl. No. 12/416,020, filed Mar. 31, 2009, Inventors Shane Pereira et al.
U.S. Appl. No. 12/831,004, filed Jul. 6, 2010, Inventors Carey S. Nachenberg et al.
U.S. Appl. No. 13/556,401, filed Jul. 24, 2012, Inventors Carey S. Nachenberg et al.
U.S. Appl. No. 13/558,177, filed Jul. 25, 2012, Inventors Scott Schneider et al.
U.S. Appl. No. 13/677,914, filed Nov. 15, 2012, Inventors Duen Hong Chau et al.
Wang, W. et al., "GraphMiner: A Structural Pattern-Mining System for Large Disk-Based Graph Databases and Its Applications," Proceedings of the 2005 ACM SIGMOD International Conference on Management of Data, ACM, 2005, pp. 879-881.
Weaver, N. et al., "A Taxonomy of Computer Worms," Proceedings of the 2003 ACM Workshop on Rapid Malcode, ACM, 2003, pp. 11-18, New York, N.Y.
Yan, X. et al., "gSpan: Graph-Based Substructure Pattern Mining," Proceedings of the 2002 IEEE International Conference on Data Mining (ICDM '02), 2002, 4 pages.
Yan, X. et al., "Mining Closed Relational Graphs with Connectivity Constraints," Proceedings of the Eleventh ACM SIGKDD International Conference on Knowledge Discovery in Data Mining, ACM, 2005, p. 333.
Yedidia, J. et al., "Understanding Belief Propagation and Its Generalizations," Exploring Artificial Intelligence in the New Millennium, 2003, pp. 236-239, vol. 8.
Zeng, Z. et al., "Coherent Closed Quasi-Clique Discovery from Large Dense Graph Databases," Proceedings of the 12th ACM SIGKDD International Conference on Knowledge Discovery and Data Mining, ACM, 2006, 6 pages.
Zhu, X., "Semi-Supervised Learning with Graphs," 2005, 174 pages.
United States Office Action, U.S. Appl. No. 11/692,469, Oct. 7, 2011, 7 pages.
United States Office Action, U.S. Appl. No. 11/692,469, Oct. 15, 2010, 12 pages.
United States Office Action, U.S. Appl. No. 11/692,469, Apr. 13, 2010, 15 pages.
United States Office Action, U.S. Appl. No. 11/863,110, Dec. 20, 2010, 11 pages.
United States Office Action, U.S. Appl. No. 12/059,258, Jun. 22, 2010, 23 pages.
United States Office Action, U.S. Appl. No. 12/059,258, Dec. 8, 2009, 21 pages.
United States Office Action, U.S. Appl. No. 12/059,271, Oct. 7, 2011, 12 pages.
United States Office Action, U.S. Appl. No. 12/165,599, Dec. 9, 2011, 35 pages.
United States Office Action, U.S. Appl. No. 12/242,634, Sep. 16, 2011, 11 pages.
United States Office Action, U.S. Appl. No. 12/242,634, Mar. 11, 2011, 10 pages.
United States Office Action, U.S. Appl. No. 12/407,772, Feb. 29, 2012, 13 pages.
United States Office Action, U.S. Appl. No. 12/407,772, Oct. 13, 2011, 13 pages.
United States Office Action, U.S. Appl. No. 12/416,020, Jan. 20, 2012, 14 pages.
Aringhieri, R. et al., "Fuzzy Techniques for Trust and Reputation Management in Anonymous Peer-to-Peer Systems," Journal of the American Society for Information Science and Technology, 2006, pp. 528-537, vol. 57, No. 4, accessed Jan. 15, 2013 at <http://onlinelibrary.wiley.com/doi11 0.1 002/asi.20307/pdf>.
Xie, Y. et al., "Innocent by Association: Early Recognition of Legitimate Users," Oct. 16-18, 2012, CCS '12: Proceedings of the 2012 ACM Conference on Computer and Communications Security,; pp. 353-364.
White, R., "How Computers Work," Que, Oct. 2003, 44 pages.
Hwang, K. et al., "Cloud Security with Virtualized Defense and Reputation-Based Trust Management," Eighh IEEE International Conference on Dependable, Automatic and Secure Computing, DASC '09, Dec. 12-14, 2009, pp. 717-722.
Kilinc, C. et al., "WallDroid: Cloud Assisted Virtualized Application Specific Firewalls for the Android OS," 2012 IEEE 11th International Conference on Trust, Security and Privacy in Computing and Communications (TrustCom), Jun. 25-27, 2012, pp. 877-883.

* cited by examiner

HYGIENE BASED COMPUTER SECURITY

CROSS REFERENCE TO RELATED APPLICATIONS

This application is a continuation of prior application Ser. No. 11/618,215, filed Dec. 29, 2006, which is incorporated by reference herein in its entirety.

BACKGROUND OF THE INVENTION

1. Field of the Invention

This invention pertains in general to computer security and in particular to assessing risks presented by computer files, web sites, and/or other entities that can potentially compromise a computer.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

While classical malware was usually mass-distributed to many computers, modern malware is often targeted and delivered to only a relative handful of computers. A Trojan horse program can be designed to target computers in a particular department of a particular enterprise. Likewise, a false email can include a phishing attack that is directed to only customers of a certain bank or other electronic commerce site.

Mass-distributed malware can often be detected and disabled by conventional security software. The security software uses techniques such as signature scanning and behavior monitoring heuristics to detect the malware. However, these techniques are less effective for detecting targeted threats since there are fewer instances of the same malware, and the security software might not be configured to recognize it.

Moreover, even mass-distributed malware is becoming harder to detect. A malicious website might automatically generate new malicious code for every few visitors. As a result, the malware is widely-distributed but only a small number of users have the exact same code, and it becomes impractical to generate signatures (and use signature scanning-based techniques) to detect it. Sometimes, the different versions of the malware perform different functions, which also makes the malware difficult to detect through heuristics and other techniques. Therefore, there is a need in the art for new ways to detect malware.

Further, security companies that analyze malware in order to develop signatures, heuristics, and other techniques for detecting it receive a large number of malware submissions. The security companies sometimes have no way to effectively measure the threat posed by submitted malware. For example, the security companies might not know whether submitted software is truly malicious or how widely a particular piece of malware is distributed. As a consequence, the security companies have a difficult time ranking or triaging the malware submissions in order to focus on analyzing the submissions that constitute the greatest threats. Accordingly, there is a need in the art for ways to evaluate the threats posed by submitted malware.

BRIEF SUMMARY

Systems, methods, and computer program products address the above and other needs by providing security to clients. In one embodiment, a method of providing computer security comprises determining hygiene scores associated with a plurality of clients. The hygiene scores represent assessments of the trustworthiness of the clients. The method further comprises receiving data describing an entity encountered by one or more of the plurality of clients and calculating a reputation score for the entity responsive to the client hygiene scores. The reputation score represents an assessment of whether the entity is malicious.

In one embodiment, a system for providing computer security comprises a hygiene cache for storing hygiene scores associated with a plurality of clients, where the hygiene scores represent assessments of the trustworthiness of the clients. The system further comprises a state information module for storing data describing an entity encountered by one or more of the plurality of clients and a reputation computation module for calculating a reputation score for the entity responsive to the client hygiene scores, where the reputation score represents an assessment of whether the entity is malicious.

In one embodiment, a method of providing security for a client comprises monitoring a state of the client to detect an encounter with an entity. The method further comprises receiving a reputation score for the entity encountered by the client from a reputation server, the reputation score representing an assessment of whether the entity is malicious and calculated responsive to hygiene scores of other clients that encountered the entity, and the hygiene scores representing assessments of the trustworthiness of the clients. The method evaluates the reputation score for the entity to determine whether the entity is malicious.

In one embodiment, a computer program product having a computer-readable medium with computer program instructions embodied therein for providing security on a client. The computer program instructions comprise a state monitoring module for monitoring a state of the client to detect an encounter with an entity. The computer program instructions further comprise a server communication module for receiving a reputation score for the entity encountered by the client from a reputation server, the reputation score representing an assessment of whether the entity is malicious and calculated responsive to hygiene scores of other clients that encountered the entity, and the hygiene scores representing assessments of the trustworthiness of the clients. In addition, the instructions comprise a reputation evaluation module for evaluating the reputation score for the entity to determine whether the entity is malicious.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
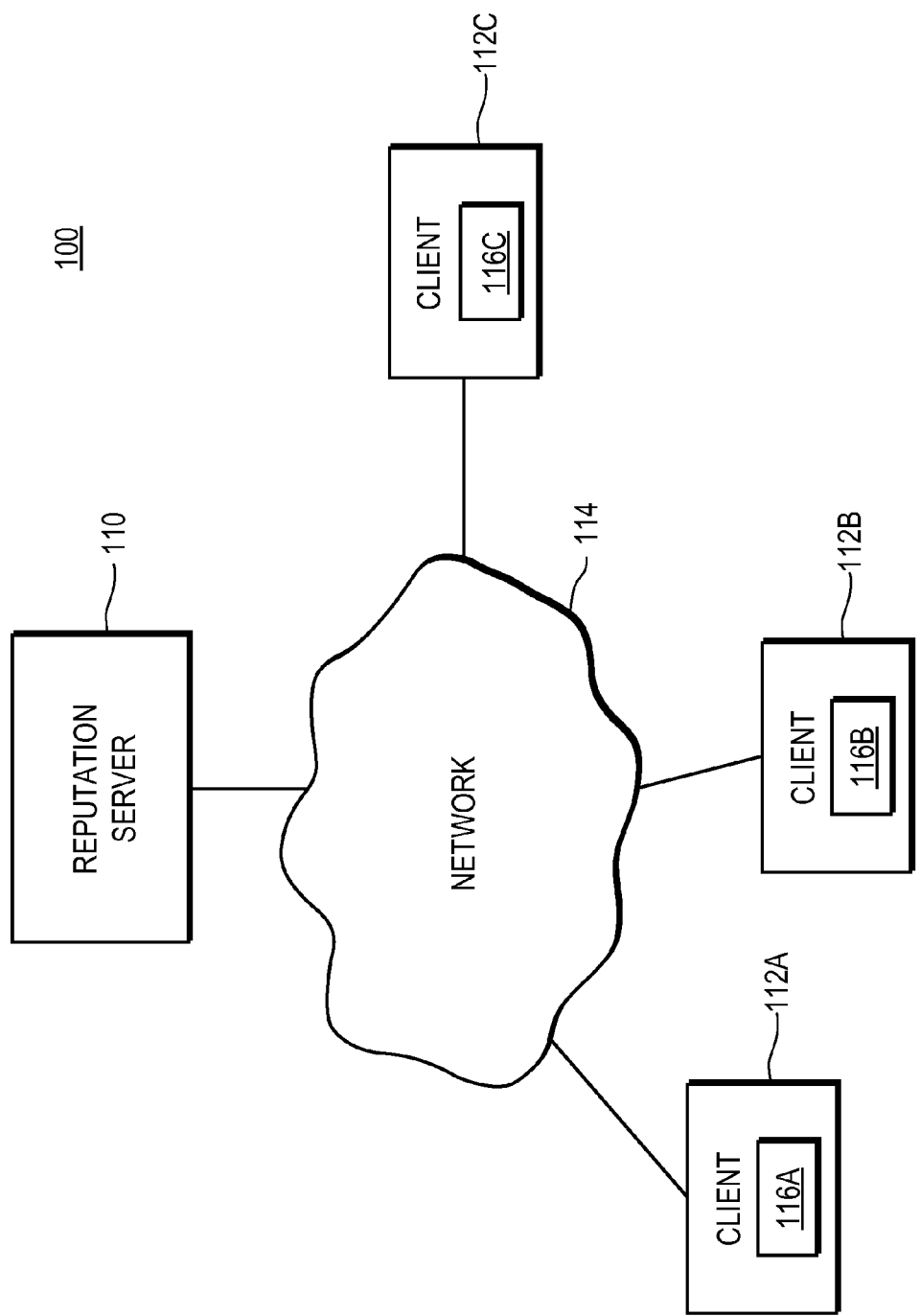
FIG. 1 is a high-level block diagram of a computing environment according to one embodiment.

FIG. 1 is a high-level block diagram of a computing environment 100 according to one embodiment. FIG. 1 illustrates a reputation server 110 and three clients 112 connected by a network 114. Only three clients 112 are shown in FIG. 1 in order to simplify and clarify the description. Embodiments of the computing environment 100 can have thousands or millions of clients 112 connected to the network 114.

FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A," "112B," and/or "112C" in the figures).

The reputation server 110 interacts the clients 112 via the network 114. In one embodiment, the reputation server 110 receives hygiene scores for the clients 112. A client's hygiene score represents an assessment of the trustworthiness of the client 112. "Trustworthiness" in this context refers to the client's propensity for getting infected by malware and other computer related threats, where a client 112 that is infected more often is less trustworthy. "Trustworthiness" also corresponds to the ability of the user to avoid the threats. In some embodiments, the reputation server 110 computes the hygiene scores itself based on the data received from the clients 112. Further, the reputation server 110 receives data describing the state of the client 112, such as files present, downloaded, installed, or executed on the clients, websites visited by the clients, and malware detected on the clients 110.

In one embodiment, the reputation server 110 analyzes the collective states of the clients 112 in view of the clients' hygiene scores, and computes reputation scores for particular programs, files, websites, and other computer-related entities encountered by the clients. A reputation score is an assessment of the likelihood that an entity is malicious (e.g., is a computer-related threat). For example, if a particular file is predominantly encountered by clients 112 with low hygiene scores, there is an elevated risk that the file is malicious because most users that use the file are poor at avoiding computer threats. Therefore, the file is likely to receive a low reputation score. Similarly, a website that is frequently visited by clients 112 having high hygiene scores is likely to receive a high reputation score because the website is frequented by users that are good at avoiding computer threats. The reputation server 110 provides the reputation scores to the clients 112, and the clients (and users of the clients) use the scores to guide behaviors with respect to whether to perform certain activities. For example, a client 112 can be configured to block downloading of files that have reputation scores below a threshold. Likewise, a user can decline to install or execute a file upon viewing that file's low reputation score.

In one embodiment, a client 112 is a computer used by one or more users to perform activities including downloading, installing, and/or executing files and browsing web sites on the network 114. The client 112, for example, can be a personal computer executing a web browser such as MICROSOFT INTERNET EXPLORER that allows the user to retrieve and display content from web servers and other computers on the network 114. In other embodiments, the client 112 is a network-capable device other than a computer, such as a personal digital assistant (PDA), a mobile telephone, a pager, a television "set-top box," etc. For purposes of this description, the term "client" also includes computers such as servers and gateways that encounter files or other entities that might constitute malware or other threats. For example, a client 112 can be a network gateway located between an enterprise network and the Internet. The client 112 can also be a mail server or web server that stores files that can be accessed by other clients.

In one embodiment, the client 112 executes a security module 116 that monitors the state of the client. The state includes activities performed on the client, such as files installed, executed, and downloaded, web sites visited, etc. In addition, an embodiment of the security module 116 also monitors malware detections on the client 112. The security module 116 provides data describing the state to the reputation server 110.

Further, an embodiment of the security module 116 computes the client's hygiene score based on its state and provides this score to the reputation server 110. Oftentimes, there is a vast disparity in hygiene scores. Certain types of users, such as teenagers, are substantially more likely to engage in risky online behaviors than other users. For example, teenagers and other young people are more likely to download files from peer-to-peer networks and other places where malware is often found. These activities lead to increased detections of malware and, as a result, clients used by such users often receive low hygiene scores. Other users do not engage in risky behaviors and encounter malware infrequently. Clients 112 of these latter users receive high hygiene scores.

In addition, the security module 116 receives reputation scores 116 from the reputation server 110. In one embodiment, the security module 116 evaluates the reputation score for an entity by, for example, comparing it to a threshold or displaying a message based on it to the user. The security module 116 optionally cancels an activity or performs another operation involving the entity in response to a result of the evaluation. The security module 116 provides a description of the operation performed as a result of the evaluation to the reputation sever 110.

Using hygiene and reputation scores in this manner associates the users' abilities to avoid threats with their decisions to engage in certain activities involving computer-related entities they encounter. This approach leverages the collective intelligence of the users to assign reputation scores to files, websites, and other entities that accurately measures the risks associated with the entities. The reputation scores are computed without requiring the users to explicitly evaluate or judge the entity. Further, the reputation scores are computed without requiring a sophisticated analysis of the files, websites, or other potentially-malicious entities. Thus, the approach is well-suited to a computing environment where there are significant amounts of malware or other threats that might not be identified using conventional signature scanning and/or heuristic techniques.

The network 114 represents the communication pathways between the reputation server 110 and clients 112. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
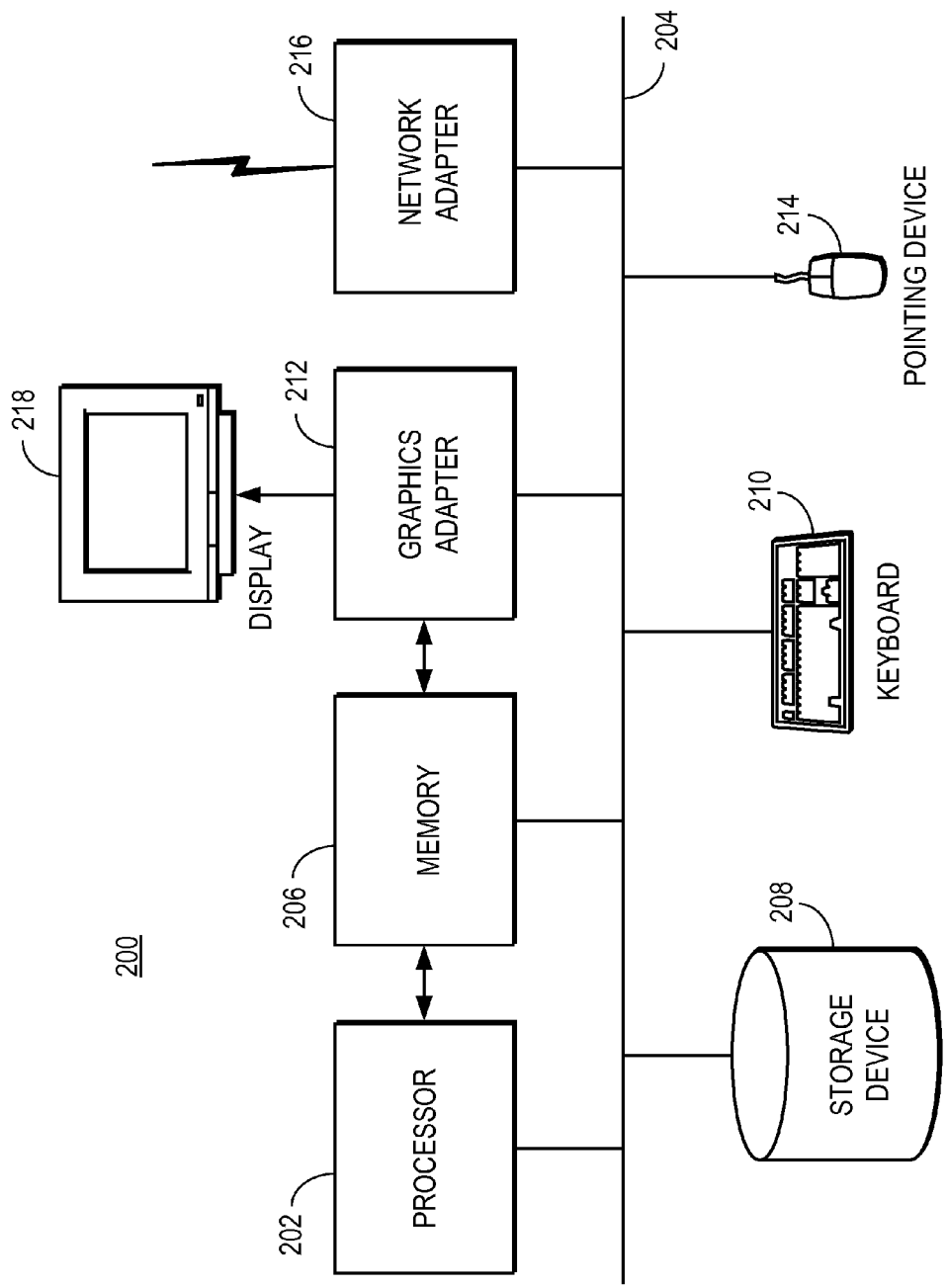
FIG. 2 is a high-level block diagram illustrating a typical computer for use as a reputation server or client.

FIG. 2 is a high-level block diagram illustrating a typical computer 200 for use as a reputation server 110 or client 112. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, a client 112 that is a mobile telephone typically has limited processing power, a small display 218, and might lack a pointing device 214. The reputation server 110, in contrast, may comprise multiple blade servers working together to provide the functionality described herein.

Figure 3:
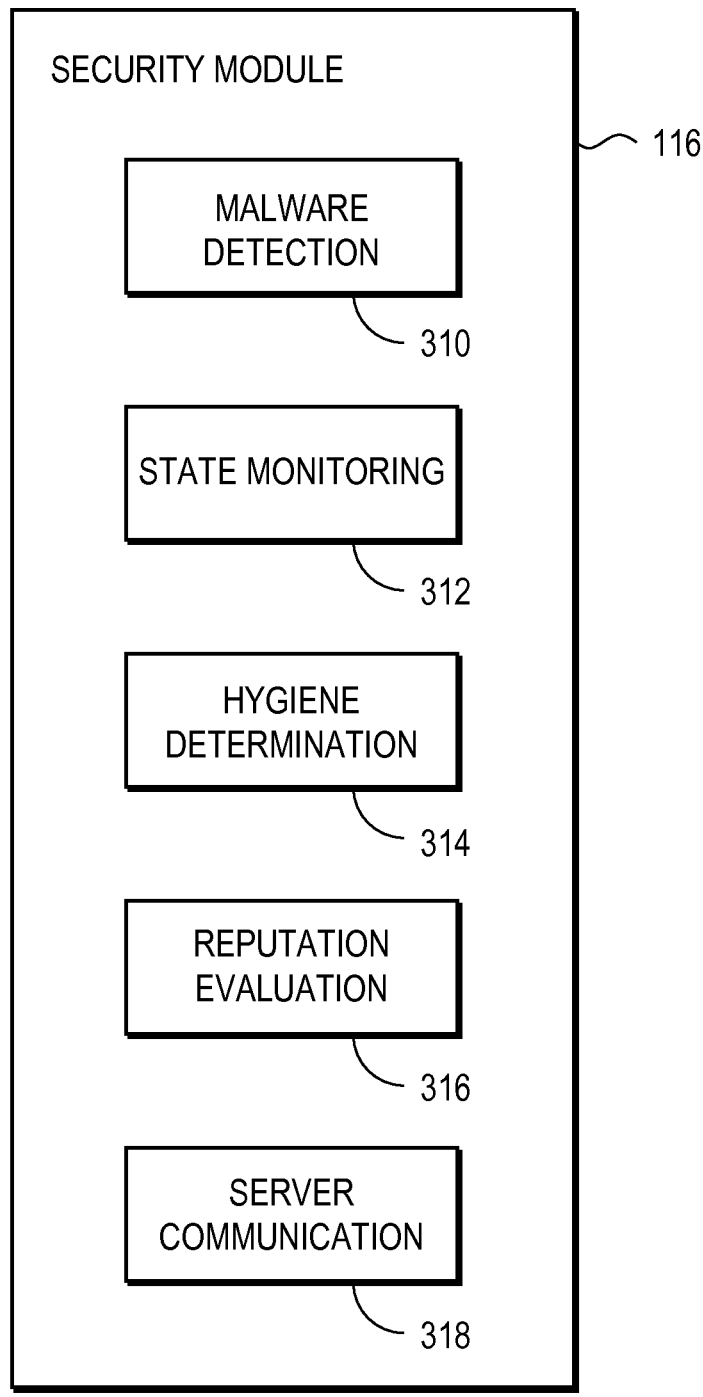
FIG. 3 is a high-level block diagram illustrating a detailed view of the security module of a client according to one embodiment.

FIG. 3 is a high-level block diagram illustrating a detailed view of the security module 116 of a client 112 according to one embodiment. In some embodiments the security module 116 is incorporated into an operating system executing on the client 112 while in other embodiments the security module is a standalone application or part of another product. As shown in FIG. 3, the security module 116 itself includes multiple modules. Those of skill in the art will recognize that other embodiments of the security module 116 can have different and/or other modules than the ones described here, and that the functionalities can be distributed among the modules in a different manner.

A malware detection module 310 detects the presence of malware on the client 112. As mentioned above, "malware" includes software such as computer viruses, worms, Trojan horse programs, and the like. For purposes of this description, "malware" also includes malicious websites such as "phishing" sites that attempt to trick users into revealing confidential information. In one embodiment, the malware detection module 310 includes a signature database that describes known types of malware. The malware detection module 310 uses techniques such as emulation and signature scanning to match signatures in the database with files and/or other data on the client 112. If a match occurs, the matching data are assumed to be malware. In addition, embodiments of the malware detection module 310 use heuristics and other techniques to detect previously-unknown malware. In some embodiments, the malware detection module 310 includes additional functionality for performing tasks such as preventing the malware from damaging the client 112 and removing the malware.

Further, an embodiment of the malware detection module 310 submits detected files or other entities to the reputation server 110 for subsequent analysis. Sometimes, the malware detection module 310 will identify previously-unknown malware through heuristic or other techniques. In these situations, it is often desirable to submit the malware to the reputation server 110 to enable specialists associated with the reputation server 110 to analyze it. This analysis can lead to improved techniques for detecting and disabling the malware, repairing clients 112 infected by it, and reducing the amount of false positive detections.

A state monitoring module 312 monitors the state of the client 112 to detect encounters between the client 112 and entities such as files and websites that are relevant to the client's hygiene score or an entity's reputation score. To this end, an embodiment of the state monitoring module 312 identifies files that are resident on the client's storage device 208 and processes that are resident in the client's memory 206. In addition, the state monitoring module 312 monitors activities performed on the client 112 that are relevant to the client's hygiene score or an entity's reputation score. In one embodiment, the types of monitoring performed by the state monitoring module 312 are limited based on user-configurable parameters. For example, the user can disable certain types of monitoring due to privacy or other types of concerns. In addition, an embodiment of the state monitoring module 312 can temporarily suspend an activity in order to provide an opportunity to cancel it.

More specifically, an embodiment of the state monitoring module 312 monitors activities involving files that are introduced to, or executed on, the client 112. For example, the monitored activities include downloading files from websites and/or other locations on the network 114, loading files onto the client 112 via removable media, installing files onto the client, and executing files on the client. In each instance, the state monitoring module 312 records the activity performed, and the identities of the one or more files involved in the activity. In one embodiment, the state monitoring module 312 identifies a file by generating a hash that uniquely identifies it. Further, some embodiments of the state monitoring module 312 monitor, and identify, only executable files or other file types in which malware might reside.

An embodiment of the state monitoring module 312 monitors activities involving web browsing and/or other activities conducted via the network 114. One embodiment of the state monitoring module 312 monitors network communications in order to determine the websites and/or types of websites (e.g., sex or gambling websites) browsed by the client 112. In addition, the state monitoring module 312 also identifies entities present on websites browsed by the client 112, such as particular JAVASCRIPT programs and other code embedded into the websites. Further, the state monitoring module 312 monitors characteristics of the visited websites, such as whether the websites generate pop-up windows in the client browser. Another embodiment of the state monitoring module 312 examines a file cache maintained by a client-side web browser in order to determine the sites that were visited using the browser.

A hygiene computation module 314 calculates a hygiene score for the client 112 in response to a set of metrics. In one embodiment, the metrics include malware detections by the malware detection module 310 and client state monitored by the state monitoring module 312. In one embodiment, the hygiene computation module 314 sends the data constituting the metrics to the reputation server 110, and the server calculates the hygiene score for the client.

In one embodiment, the hygiene computation module 314 uses metrics based on the frequency of occurrence of certain events, such as malware detections. For example, the metrics can include the number of malware detections observed during a time period such as a week, month, or three-month interval. Likewise, the metrics can include the number of malware detections measured relative to a number of files downloaded and/or installed on the client 112. Similarly, the activities on which the metrics are based can include the frequency that the user browses known malicious or unsavory websites (such as sex/gambling sites, sites with many pop-up windows or sites known to host phishing attacks) as measured over a time interval or relative to the total number of visited websites. The hygiene score for a client 112 can change over time if the frequency of events measured by the metrics also changes.

In one embodiment, the hygiene score is a numeric value normalized within a given range, such as zero and one, in order to allow direct comparisons between hygiene scores of multiple clients. For example, a score of zero can represent the poorest hygiene while a score of one can represent the best hygiene. In other embodiments, the hygiene score is quantized into one of a limited set of values, e.g., the only possible hygiene scores are zero and one.

A reputation evaluation module 316 receives reputation scores for files, programs, websites, and/or other entities from the reputation server 110. In one embodiment, the reputation evaluation module 316 works with the state monitoring module 312 to detect when the client 112 encounters an entity having a reputation score. These encounters can include activities performed automatically without the user's knowledge and activities that occur at the user's direction. For example, the module 316 detects when the client web browser attempts to download a file from a web server, when there is an attempt to install a file on the client 112, and when the user attempts to execute a file. In one embodiment, the reputation evaluation module 316 sends the identity of the entity (e.g., a hash of an executable file or a URL of a website) to the reputation server 110 and receives a reputation score in return. In another embodiment, the reputation evaluation module 316 maintains a cache of reputation scores for certain programs, and consults the cache before (or instead of) contacting the reputation server 110 to determine whether the score is contained therein. Further, an embodiment of the reputation evaluation module 316 maintains an exclusion set that identifies files or other entities the reputation evaluation module need not evaluate. These excluded entities are identified using digitally-signed hashes of the files and/or via other techniques.

In one embodiment, the state monitoring module 312 suspends the activity involving the entity while the reputation evaluation module 316 obtains the entity's reputation score. The reputation evaluation module 316 evaluates the reputation score and, depending upon the score, cancels the suspended activity. In one embodiment, the reputation evaluation module 316 evaluates the reputation score against a reputation threshold and cancels the activity if the score is below the threshold (and/or allows the activity if the score is above the threshold). For example, the reputation module 316 can determine that a file that the browser is attempting to download from a mail server or website has a reputation score below the threshold, and therefore cancel the downloading because the file is likely malicious. In one embodiment, the threshold is set by the user. In other embodiments, the threshold is set by an administrator of the client 112 or by the reputation server 110.

In one embodiment, the reputation evaluation module 316 displays a message describing the reputation score to the user, and thereby provides the user with an opportunity to cancel the activity in response to the score. This display can occur if the reputation score is below the reputation threshold (or below a different threshold). For example, the reputation evaluation module 316 can detect that a file the user is attempting to execute has a low reputation score, and display the reputation score or a warning message to the user to let the user evaluate the potential threat.

In some embodiments, the reputation score displayed to the user is represented as a numeric value while in other embodiments it is represented using other techniques such as a textual description or graphical icon. For example, an embodiment of reputation evaluation module 316 displays a reputation score for a file in a dialog box or other user interface (UI) element when the user attempts to execute the file. Similarly, an embodiment of the reputation evaluation module 316 provides a graphical icon describing the reputation score of a website when the user attempts to browse the site. The display presented by the reputation evaluation module 316 can include, for example, a dialog box with a message like "This program has a bad reputation. Are you sure you want to install it?," "Many people with good hygiene have installed this program, so it should be safe to use," or "This program has been tried by very few users and its reputation is unknown, would you like to test it?"

In one embodiment, the display presented by the reputation evaluation module 316 provides the user with the opportunity to cancel the activity. Thus, the dialog box presented by the module 316 can include a set of "Yes/No" or "OK/Cancel" buttons that let the user cancel or confirm the installation or execution of a file. The reputation evaluation module 316 remembers the user's response to the displayed reputation score and does not necessarily display the reputation score each time the user performs an action. As mentioned above, an embodiment of the state monitoring module 312 monitors the user's response to the reputation score, specifically whether the user chooses to continue or cancel the activity in view of the reputation score. The state monitoring module 312 notifies the reputation server 110 of the user's response. The server 110 can use the response to hone the reputation score for the entity.

A server communication module 318 communicates with the reputation server 110 via the network 114. In one embodiment, the server communication module 318 sends reports providing information about the client 112 to the server 110. The information includes the client's hygiene score, descriptions of all monitored encounters between the client 112 and entities, and submissions of potential malware. In one embodiment, the server communication module 318 reports the hygiene score to the reputation server 110 at predetermined times, such as when the hygiene score changes or at regular intervals. In another embodiment, the server communication module 318 reports the hygiene score to the reputation server 110 each time the client encounters an entity and/or detects or submits possible malware. For example, the server communication module 318 sends a tuple containing the hygiene score and the identifier of the entity to the reputation server 110 when the reputation evaluation module 316 requests the reputation score for the entity. Some embodiments include a unique client identifier or other data in the reports to allow the reputation server 110 to associate particular reports with the clients that generated them, and to detect duplicate reports. In addition, an embodiment of the server communication module 318 receives information from the reputation server 110 that is used to provide security on the client 112. The received information includes reputation scores for entities, malware definitions, and other updates to the security module 116.

Figure 4:
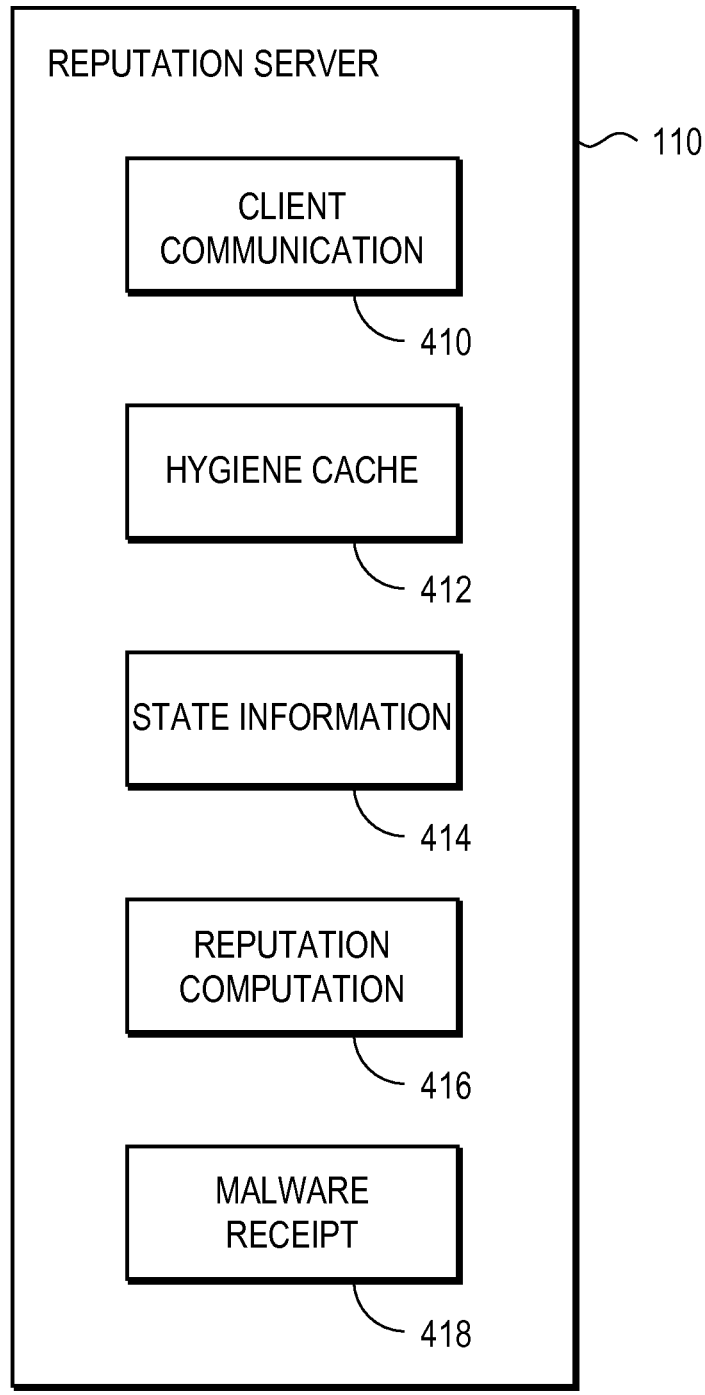
FIG. 4 is a high-level block diagram illustrating a detailed view of the reputation server according to one embodiment.

FIG. 4 is a high-level block diagram illustrating a detailed view of the reputation server 110 according to one embodiment. In one embodiment, the reputation server 110 is operating by the same entity that provides the security modules 116 to the clients 112. As shown in FIG. 4, the reputation server 110 includes several modules. Those of skill in the art will recognize that other embodiments of the reputation server 110 can have different and/or other modules than the ones described here, and that the functionalities can be distributed among the modules in a different manner. In addition, the functions ascribed to the reputation server 110 can be performed by multiple servers.

A client communication module 410 communicates with the clients 112 via the network 114. In one embodiment, the client communication module 410 receives data describing hygiene scores, monitored state, malware submissions, and other information from the clients 112. Further, an embodiment of the client communication module 410 provides reputation scores for files, websites, and other entities to the clients 112.

A hygiene cache module 412 stores hygiene scores received from the clients 112. In an embodiment where hygiene scores are received in (hygiene score, entity identifier) tuples, the hygiene cache module 412 stores the scores in a table or other data structure that associates the scores with the entities to which they pertain. In another embodiment where the hygiene scores are received with identifiers of the clients 112, the hygiene cache module 412 stores the scores in a table or other data structure that associates the scores and clients. In embodiments where the reputation server 110 calculates the hygiene score, the hygiene cache module 412 performs the functions attributed to the hygiene computation module 314 described above.

A state information module 414 stores data describing activities and other state information monitored by the state monitoring modules 312 in the clients 112. In one embodiment, the stored data describes encounters between the clients 112 and entities. These encounters include files present on, downloaded, installed, and/or executed by the clients 112, websites visited by the clients, and the like. The state information module 414 also stores data describing operations performed in response to reputation score evaluations performed at the clients 112, such as whether a user executed a particular file after viewing a message describing the program's reputation score. In one embodiment, the state information module 414 associates the activities with the hygiene scores of the clients on which the activities (and encounters) occurred. In another embodiment, the state information module 414 associates the activities with the identifiers of the clients 112 on which the activities occurred.

In one embodiment, the functions of the hygiene cache 412 and state information modules 414 are performed by a combined module that stores entity identifiers and hygiene scores of clients 112 that encountered the entity. The hygiene scores, furthermore, are represented as a histogram or in another efficient manner. For example, for a particular entity the combined module records that the entity was encountered by 5 clients having high hygiene scores and 25 clients having low hygiene scores. The module does not necessarily store the identities of the particular clients 112 that encountered the entity.

A reputation computation module 416 calculates reputation scores for files, websites, and/or other entities based on the data in the hygiene cache 412 and/or state information 414 modules. In one embodiment, the reputation score is a numeric value similar to the hygiene score. The reputation score is normalized within a given range, such as zero and one, in order to allow direct comparisons across reputation scores of different entities. For example, a score of zero can represent the lowest reputation while a score of one can represent the highest reputation. In other embodiments, the reputation score is quantized into one of a limited set of values.

The reputation score of a file or other entity is based primarily on the hygiene scores of the clients 112 that encounter the entity. For example, a file that is frequently installed and/or executed by clients 112 having high hygiene scores is likely to receive a high reputation score. In contrast, a file that is frequently installed or executed by only clients 112 having low hygiene scores is likely to receive a low reputation score.

One embodiment of the reputation computation module 416 calculates reputation scores based on cross-mixing of data. For example, assume that a set of clients 112 receives low hygiene scores because malware is frequently detected on the clients. The reputation computation module 416 can assign a low reputation score to a website that clients in the set frequently visit. The module 416 thus leverages malware detections to assign a reputation score to a website, even though the website might not be directly associated with the malware.

In one embodiment, the reputation computation module 416 calculates a reputation score by assigning weights to certain clients, and then using the weights to influence the reputation scores for files, websites, and other entities encountered by the clients. Certain clients having very high hygiene scores, enrolled in a special program, and/or meeting other criteria are designed as "super clients" and the data from those clients exert significant influence over the reputation scores of entities they encounter. For example, if one or more super clients execute particular files or visit particular websites, the reputation computation module 416 assigns a high reputation score to the files or websites because they are very likely legitimate (i.e., not malicious).

The reputation score assigned to an entity can evolve over time. One embodiment initially assigns a previously-unknown file, website, or other entity a low reputation score. This initial low score represents a "probation period" where the entity is treated as potentially-malicious until it is encountered by enough clients to assess its true reputation. Thus, the initial reputation score is likely to change as the entity is encountered by an increasing number of clients 112. A file with an initially-low reputation score can receive a higher reputation score as it is installed and executed by clients having high hygiene scores. Indeed, if the user of a client 112 having a high hygiene score chooses to install a file after viewing a dialog box indicating that it has a low reputation score, then this is a strong signal that the file deserves a higher reputation score. An embodiment of the reputation computation module 416 observes these sorts of activities and continually updates entities' reputation scores.

A malware receipt module 418 stores potential malware submitted by the malware detection modules 310 in the clients 112. In some embodiments, the malware receipt module 418 receives a large number of submissions from the clients 112 on the network 114. Given the many submissions, it is desirable to rank the submissions by the approximate amount of risk each one represents. This ranking allows the security specialists to prioritize the submissions and analyze the most dangerous ones first.

Accordingly, an embodiment of the malware receipt module 418 ranks the submissions based at least in part on the malware's reputation scores and/or usage frequency. A submitted file that has a low reputation score and is encountered by many clients 112 is prioritized over files that are encountered on relatively few clients. Submitted files having good reputation scores are assigned low rankings and/or are effectively ignored.

Figure 5:
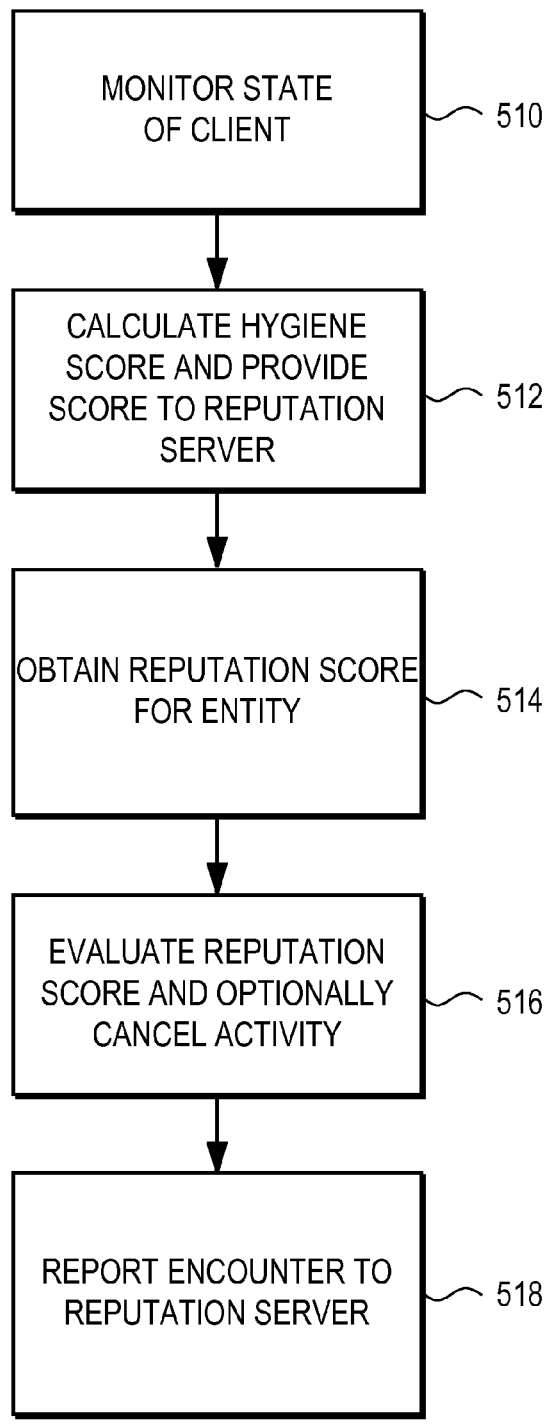
FIG. 5 is a flowchart illustrating steps performed by a security module to provide security to a client according to one embodiment.

FIG. 5 is a flowchart illustrating steps performed by a security module 116 to provide security to a client 112 according to one embodiment. Other embodiments perform the illustrated steps in different orders, and/or perform different or additional steps. Moreover, some or all of the steps can be performed by modules other than the security module 116.

The security module 116 monitors 510 the state of the client 112 for malware detections, files resident on the storage device 208, and/or activities such as browsing certain unsavory websites. The security module 116 calculates 512 a hygiene score for the client 112 based on the monitored state. For example, if many malware detections occur within a given time period, the client 112 is likely to receive a low hygiene score. The security module 116 provides the hygiene score to the reputation server 110, either as a discrete report or part of another report to the server.

At some point, the security module 116 obtains 514 a reputation score for an entity encountered by the client 112. For example, the security module 116 might identify a particular file stored on the storage device 208 or the client browser might attempt to download a file from a website. The security module 116 identifies the encountered entity using an identifier, such as a hash of the file, sends the identifier to the reputation server 110, and receives a reputation score for the entity in response. The security module 116 evaluates 516 the reputation score by, for example, comparing it to a threshold and/or displaying a message about it to the user. In some embodiments, the security module 116 optionally suspends an activity involving the entity while obtaining and evaluating its reputation score. The security module 116 or user optionally cancels the activity and/or performs another operation based on the result of the evaluation. The security module 116 reports 518 the encounter with the entity, the entity identifier, and the result of the evaluation (e.g., whether the user canceled the activity involving the entity) to the reputation server 110. In one embodiment, the report includes the hygiene score of the client 112 in order to allow the server 110 to further refine the entity's reputation score based on any actions performed as a result of the evaluation.

In one embodiment, the security module 116 reports an encounter with an entity to the reputation server 110 but does not necessarily receive a reputation score in response. For example, the security module 116 can report entities encountered on the client 112, such as static files on the storage device 208, to the reputation server 110 in order to create associations between the client 112 (and its hygiene score) and the entities encountered on it. This technique can be used to seed the environment 100 and create initial reputation scores for entities.

Figure 6:
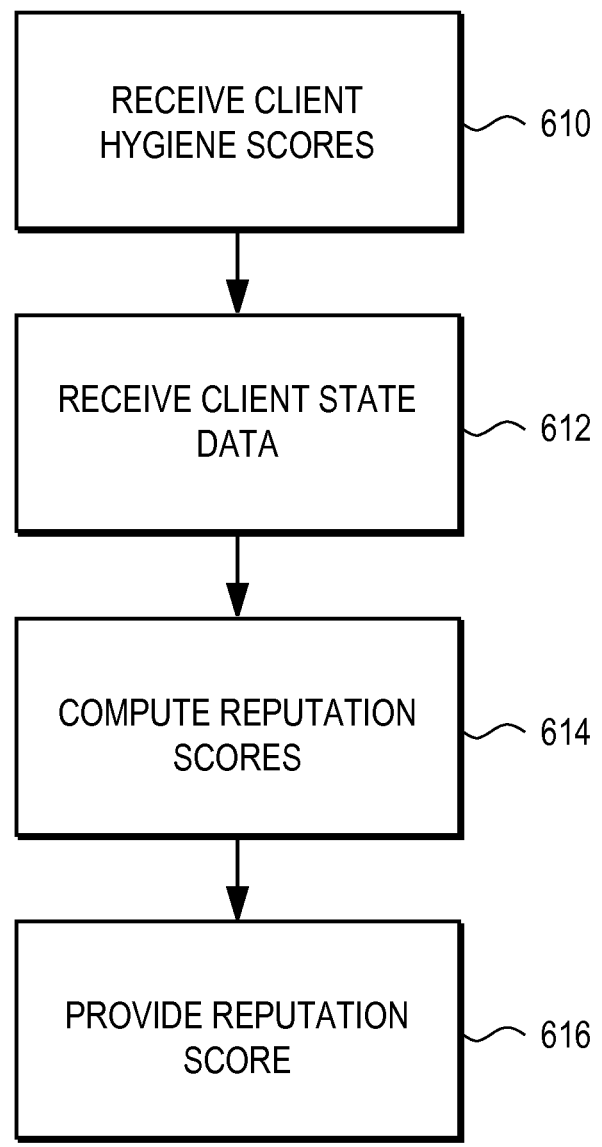
FIG. 6 is a flowchart illustrating steps performed by a reputation server according to one embodiment.

FIG. 6 is a flowchart illustrating steps performed by a reputation server 110 according to one embodiment. Those of skill in the art will recognize that embodiments of the reputation server 110 simultaneously communicate with multiple clients 112 and compute reputation scores for multiple entities. Therefore, embodiments of the reputation server 110 may perform multiple instances of the steps of FIG. 6 simultaneously. Other embodiments perform the illustrated steps in different orders, and/or perform different or additional steps. Moreover, some or all of the steps can be performed by servers other than the reputation server 110.

The reputation server 110 receives 610 hygiene scores from the clients 112. As described above, the hygiene scores represent assessments of the trustworthiness of the clients. The reputation server 110 also receives 612 data describing monitored client state. These data describe encounters with entities such as files, programs, and websites. For example, the data can describe files downloaded, installed and/or executed, and websites visited by the client.

The reputation server 110 computes 614 reputation scores for the entities encountered at the clients 112. The reputation scores are based on the hygiene scores of the clients 112. The server 110 may compute a high reputation score for a file that is frequently encountered by clients 112 having high hygiene scores. In the same vein, the server 110 may compute a low reputation score for a file most frequently encountered on clients 112 having low hygiene scores.

The reputation server 110 provides 616 an entity's reputation score to a client 112. For example, the reputation server 110 may receive a request for the reputation score of a file identified by a hash, and provide the score in response. The clients 112 and/or users of the clients evaluate the scores to determine whether the entities are legitimate. In one embodiment, reputation server 110 continually updates the reputation scores based on the encounters and resulting evaluations.

Figure 7:
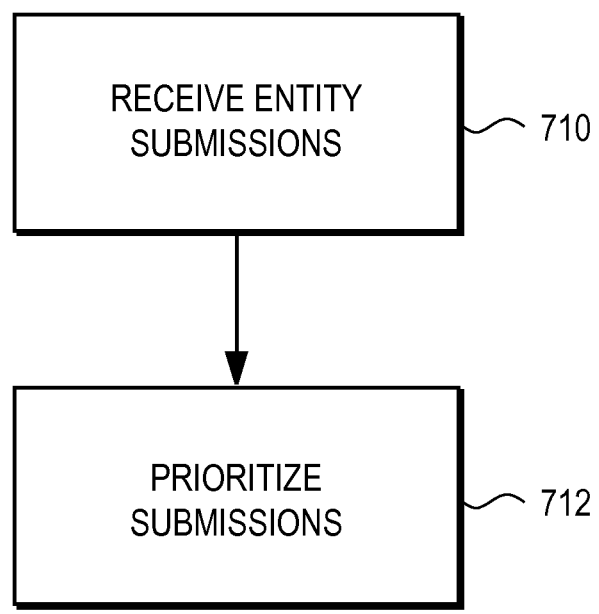
FIG. 7 is a flowchart illustrating steps performed by a reputation server to prioritize submitted malware according to one embodiment.

FIG. 7 is a flowchart illustrating steps performed by a reputation server 110 to prioritize submitted entities according to one embodiment. Other embodiments perform the illustrated steps in different orders, and/or perform different or additional steps. Moreover, some or all of the steps can be performed by servers other than the reputation server 110.

The reputation server 110 receives 710 submissions from the clients 112 with files in which malware was detected or suspected. These submissions may include files with malicious software and files containing legitimate software that were detected due to false positives or for other reasons. The reputation server 712 prioritizes the submissions based on reputation scores. Submitted files having low reputation scores and/or frequently encountered on clients 112 generally receive a high priority. In contrast, submitted files having high reputation scores and/or infrequently encountered on clients 112 generally receives a lower priority. Security specialists use the priorities to rank the submitted files in order to determine which submissions to analyze.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for computer security comprising:
  determining client hygiene scores associated with a plurality of clients that represent assessments of abilities of the clients in avoiding malware threats, the client hygiene scores based on amounts of malware detected at the clients;
  receiving data describing one of a computer file that is downloaded, installed, or executed by one or more clients of the plurality of clients or a website that is visited by the one or more clients of the plurality of clients;
  calculating, by a processor, a reputation score for the computer file or website responsive to the client hygiene scores of the one or more clients of the plurality of clients that downloaded, installed, or executed the computer file or visited the website, the client hygiene scores of the one or more clients used as an input in calculating the reputation score, the reputation score representing an assessment of whether the computer file or website is malicious; and
  providing the reputation score for the computer file or website to a client of the plurality of clients for providing computer security at the client.

2. The method of claim 1, wherein the client hygiene scores associated with the plurality of clients that represent assessments of the abilities of the clients in avoiding malware threats are based on amounts of malware detected at the clients using signature scanning techniques.

3. The method of claim 1, wherein the client hygiene scores are based on frequencies of malware detected at the clients.

4. The method of claim 1, wherein calculating the reputation score for the computer file or website comprises:
  identifying a set of super clients from the one or more clients that have downloaded, installed, or executed the computer file or visited the website, the set of super clients having client hygiene scores indicating an ability to avoid malware threats; and
  calculating the reputation score for the computer file or website responsive to the set of super clients having client hygiene scores indicating the ability to avoid malware threats.

5. The method of claim 4, wherein calculating the reputation score for the computer file or website responsive to the set of super clients having client hygiene scores indicating an ability to avoid malware threats comprises:
  receiving information from the super clients describing operations the super clients performed in response to evaluating the reputation score of the computer file or website; and
  calculating the reputation score based on the operations the super clients performed in response to evaluating the reputation score of the computer file or website.

6. A system, comprising:
  a non-transitory computer readable medium with computer program instructions embodied thereon, the computer program instructions comprising instructions to:
  determine client hygiene scores associated with a plurality of clients that represent assessments of abilities of the clients in avoiding malware threats, the client hygiene scores based on amounts of malware detected at the clients;
  receive data describing one of a computer file that is downloaded, installed, or executed by one or more clients of the plurality of clients or a website that is visited by the one or more clients of the plurality of clients;
  calculate a reputation score for the computer file or website responsive to the client hygiene scores of the one or more clients of the plurality of clients that downloaded, installed, or executed the computer file or visited the website, the client hygiene scores of the one or more clients used as an input in calculating the reputation score, the reputation score representing an assessment of whether the computer file or website is malicious; and
  provide the reputation score for the computer file or website to a client of the plurality of clients for providing computer security at the client; and
  a hardware processor for executing the computer program instructions.

7. The system of claim 6, wherein the client hygiene scores associated with the plurality of clients that represent assessments of the abilities of the clients in avoiding malware threats are based on amounts of malware detected at the clients using signature scanning techniques.

8. The system of claim 6, wherein the client hygiene scores are based on frequencies of malware detected at the clients.

9. The system of claim 6, wherein the instructions to calculate the reputation score for the computer file or website comprise instructions to:
  identify a set of super clients from the one or more clients that have downloaded, installed, or executed the computer file or visited the website, the set of super clients having client hygiene scores indicating an ability to avoid malware threats; and
  calculate the reputation score for the computer file or website responsive to the set of super clients having client hygiene scores indicating the ability to avoid malware threats.

10. The system of claim 9, wherein the instructions to calculate the reputation score for the computer file or website responsive to the set of super clients having client hygiene scores indicating an ability to avoid malware threats comprise instructions to:
  receive information from the super clients describing operations the super clients performed in response to evaluating the reputation score of the computer file or website; and
  calculate the reputation score based on the operations the super clients performed in response to evaluating the reputation score of the computer file or website.

11. A non-transitory computer-readable medium with computer program instructions embodied therein, the computer program instructions comprising instructions that when executed by a processor causes the processor to:
  monitor a state of a client to detect one of a computer file that is downloaded, installed, or executed by the client or a website that is visited by the client;
  receive a reputation score for the computer file or website from a reputation server, the reputation score representing an assessment of whether the computer file or website is malicious and calculated responsive to client hygiene scores of other clients that downloaded, installed, or executed the computer file or visited the website by using the client hygiene scores as an input in calculating the reputation score, the client hygiene scores representing assessments of abilities of the other clients in avoiding malware threats, the client hygiene scores based on amounts of malware detected at the other clients;
  evaluate the reputation score for the computer file or website to determine whether the computer file or website is malicious; and
  cancel an activity involving the computer file or website responsive to the computer file or website being malicious.

12. The non-transitory computer-readable medium of claim 11, wherein the instructions further comprise instructions to:
calculate a client hygiene score for the client that represents an assessment of an ability of the client in avoiding malware threats; and
provide the client hygiene score for the client to the reputation server.

13. The non-transitory computer-readable medium of claim 12, wherein the instructions to calculate the client hygiene score for the client comprise instructions to:
determine a frequency at which malware is detected on the client; and
calculate the client hygiene score responsive to the frequency at which malware is detected on the client, wherein more frequent detections of malware result in the client hygiene score indicating that the client has less ability to avoid malware threats.

14. The non-transitory computer-readable medium of claim 11, wherein the instructions further comprise instructions to:
determine an operation performed on the client in response to evaluating the reputation score of the computer file or website; and
provide, to the reputation server, the data describing the operation performed on the client in response to evaluating the reputation score of the computer file or website.

15. The non-transitory computer-readable medium of claim 11, wherein the instructions further comprise instructions to:
identify the computer file that is downloaded, installed, or executed by the client or the website that is visited by the client using a unique identifier; and
provide the unique identifier to the reputation server,
wherein the reputation score for the computer file or website is received from the reputation server responsive to providing the server with the unique identifier.

16. The non-transitory computer-readable medium of claim 11, wherein the instructions further comprise instructions to:
suspend the activity involving the computer file or website;
display a message describing the reputation score for the computer file or website to a user of the client; and
display a user interface to the user enabling the user to cancel the activity.

* * * * *